United States Patent [19]

Himmler et al.

[11] Patent Number: 4,916,943

[45] Date of Patent: Apr. 17, 1990

[54] APPARATUS FOR MONITORING AND CONTROLLING THE TIRE INFLATION PRESSURE IN A TIRE TESTING MACHINE

[75] Inventors: Günther Himmler, Darmstadt; Werner Lehr, Modautal, both of Fed. Rep. of Germany

[73] Assignee: Gebr. Hofmann GmbH & Co. KG Maschinenfabrik, Pfungstadt, Fed. Rep. of Germany

[21] Appl. No.: 379,070

[22] Filed: Jul. 13, 1989

[30] Foreign Application Priority Data

Jul. 27, 1988 [DE] Fed. Rep. of Germany ....... 3825505

[51] Int. Cl.⁴ .......................................... G01M 17/02
[52] U.S. Cl. .......................................... 73/146; 141/4
[58] Field of Search ................... 73/146, 8; 141/4, 67, 141/83, 95

[56] References Cited

U.S. PATENT DOCUMENTS 2,695,520 11/1954 Karsai ..................................... 73/146
4,702,287 10/1987 Higbie ..................................... 141/4

Primary Examiner—Donald O. Woodiel
Attorney, Agent, or Firm—Cushman, Darby & Cushman

[57] ABSTRACT

An apparatus for monitoring and controlling the tire inflation pressure in a tire testing machine comprises first and second measuring rim portions for mounting a tire therebetween, and a pressure sensor operable to detect the inflation pressure of the tire. The pressure sensor has a pressure-receiving surface which is arranged to directly detect the pressure in the interior of the tire. The pressure sensor rotates with the tire in a tire testing run. A spindle connected to the measuring rim portions and rotatable therewith has conduit means for supplying compressed air to inflate the tire. A control means is operable to close off the conduit means, thereby constituting a closed volume of air defined by the space within the tire, the space between the measuring rim portions holding the tire, and the conduit means in the spindle, that volume of air rotating as a unit with the components defining same, during a tire testing operation.

13 Claims, 1 Drawing Sheet

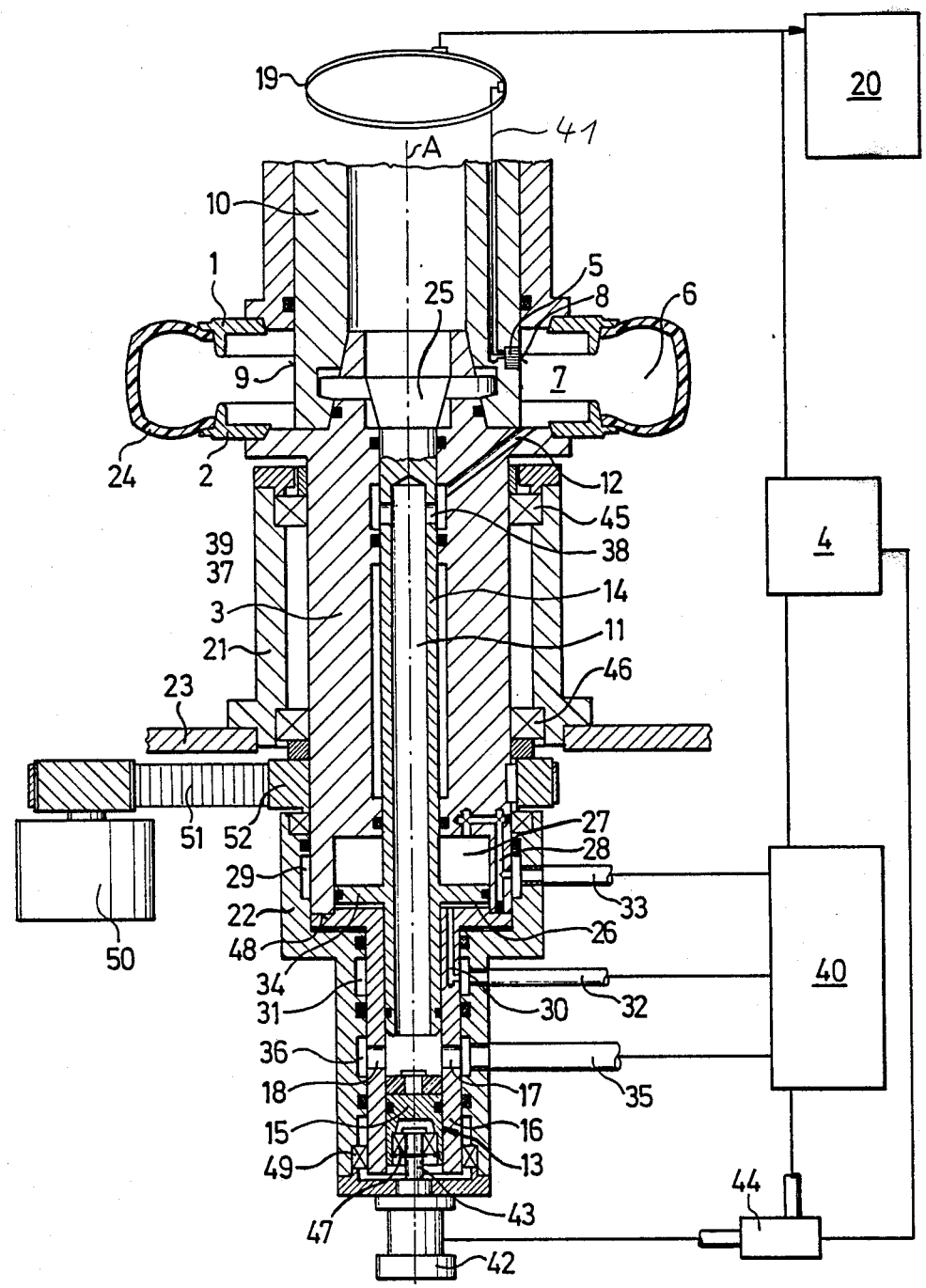

APPARATUS FOR MONITORING AND CONTROLLING THE TIRE INFLATION PRESSURE IN A TIRE TESTING MACHINE

BACKGROUND OF THE INVENTION

The present invention concerns an apparatus for monitoring and controlling the tire inflation pressure in a tire testing machine.

In one form of such an apparatus, as disclosed for example in U.S. Pat. No. 2,695,520, the pneumatic tire to be tested is mounted in a tire testing machine between first and second measuring rim portions which are rotatable about a common axis and which are also displaceable axially relative to each other. The tire to be tested is thus carried between the first and second measuring rim portions and can be inflated therebetween. For that purpose, compressed air for inflating the tire is supplied from a stationary compressed air source and passes by way of a compressed air conduit into a pressure inflation chamber defined by the interior of the tire mounted between the first and second measuring rim portions, and the intermediate space between the first and second measuring rim portions. The compressed air conduit in that arrangement extends coaxially through a spindle which is connected to and rotates with one of the measuring rim portions. The compressed air is supplied to the outer end of the spindle by way of a rotary connection and thereby is passed into the compressed air conduit which extends through the spindle. The apparatus further includes a measuring means which is disposed in stationary outside members of the installation and which regulates the required inflation pressure in the tire to be tested. The entire assembly consisting of the air pressure control and regulating means is disposed upstream of the rotary connection to the spindle, in a part of the installation which is stationary.

Another apparatus for monitoring and controlling tire inflation pressure in a tire testing machine is disclosed in U.S. Pat. No. 4,702,287 and involves an arrangement in respect of the air pressure control and regulating means which is similar to that just discussed above.

During the operation of testing a pneumatic tire which, during the testing run, rolls against a testing drum or other suitable support surface, the tire inflation pressure must be kept substantially constant in order to prevent measurement errors from occurring. Fluctuations in tire inflation pressure give rise to fluctuations in the radial forces involved in rotation of the tire, and those fluctuations in radial forces can falsify the measurement result. The reason for that is that the tire contact area or contact patch, with which the tire bears against the rotating testing drum or other surface, fluctuates in size if the level of inflation pressure of the tire varies, thus giving rise to the above-mentioned fluctuations in radial forces. In the apparatuses discussed above, it is not possible to prevent air from leaking from the tire during the testing operation, so that the inflation pressure of the tire varies accordingly, such air leakage occurring at the sealing locations between stationary outside components of the installation and the rotating parts thereof, more particularly in the region of the rotary connection at the outer end of the spindle. However that leakage of air is not constant but depends on the speed and direction of rotation of the tire during the testing operation. For that reason it is necessary to provide for adjustment of the inflation pressure by means of the introduction of compressed air into the tire to set the inflation pressure to the correct level, in order thereby to compensate for the leakage losses and to maintain a constant pressure in the tire. However that is not a viable option in many situations, within a predetermined testing time. Furthermore, the existence of the above-mentioned leakage losses means that it is not generally possible to arrive at satisfactory conclusions regarding the conditions in respect of pressure in the rotating part of the apparatus, more especially in the pressure chamber defined between the first and second measuring rim portions and the interior of the tire.

Another difficulty arises out of the fact that a tire which suffers from radial run-out, in conjunction with a fluctuation in inflation pressure, will produce a fluctuation in the radial forces acting by way of the tire contact patch. Steps to eliminate the fluctuation in pressure by regulating the tire inflation pressure would result in the fluctuation in radial forces at least partially disappearing. That however simulates a uniform and true-running tire, which is not actually the case when the tire is brought into use on a vehicle.

SUMMARY OF THE INVENTION

An object of the present invention is to provide an apparatus for monitoring and controlling the tire inflation pressure in a tire testing machine, in which the tire inflation pressure is substantially unaffected by leakage points at a rotary connection between a stationary part of the installation and rotating parts thereof.

Another object of the present invention is to provide an apparatus for monitoring and controlling the tire inflation pressure in a tire testing machine, which is adapted to provide more accurate results.

Still another object of the present invention is to provide a tire testing machine which is adapted to maintain a substantially constant inflation pressure in a tire to be tested, during a testing operation.

In accordance with the present invention, these and other objects are achieved by an apparatus for monitoring and controlling the tire inflation pressure in a tire testing machine, comprising first and second measuring rim portions which are rotatable about a common axis and which are displaceable axially relative to each other, a pneumatic tire to be tested being mounted between the measuring rim portions in a measuring run. A compressed air conduit supplies compressed air for inflating the tire, from a stationary compressed air source. The compressed air is supplied from the compressed air source to the tire through a spindle which is connected to and rotates with one of the first and second measuring rim portions. The compressed air passes into the pressure chamber defined by the interior of the tire mounted between the first and second measuring rim portions, and the intermediate space between the measuring rim portions. The apparatus has a control means to control the supply of compressed air through the conduit into the pressure chamber, in dependence on the air pressure in the tire which is detected by a pressure sensor. The pressure sensor is adapted to rotate with the measuring rim portions and comprises at least one pressure-receiving surface disposed in the above-mentioned pressure chamber. The pressure-receiving surface of the pressure sensor is thus directly subjected to the effect of the inflation pressure in the above-mentioned pressure chamber, that inflation pressure being the control parameter for operation of the control means to control the feed of compressed air. The compressed air conduit which thus also rotates with the spindle and the measuring rim portions further includes a closure means which rotates therewith, for selectively closing off the compressed air conduit under the control of the control means.

It will be seen therefore that the pressure in the pressure chamber defined between the first and second measuring rim portions and the interior of the tire is used in the arrangement of the invention as the control parameter in respect of the air pressure control and regulating means. For that purpose the pressure sensor is preferably of such a design that it rotates therewith and the pressure in the pressure chamber thus acts directly on the pressure-receiving surface of the pressure sensor. In a preferred construction the pressure sensor can be in the form of a transducer which produces electrical signals that are proportional to the pressure in the pressure chamber defined between the measuring rim portions and the tire.

The closure means operatively associated with the compressed air conduit by way of which compressed air is passed into the above-mentioned pressure chamber is of such a design that it also rotates with the spindle which in turn is connected to one of the measuring rim portions. That arrangement provides that, when the desired inflation pressure in the tire to be tested has been set, the column of air within the pressure chamber defined between the measuring rim portions and the interior of the tire, and within the compressed air conduit, is hermetically closed off by the closure means so that there cannot be any leakage of air in that region between rotating parts of the arrangement and non-rotating parts. That makes it possible to maintain a constant pressure which is thus directly detected by means of the pressure sensor which is responsive to the pressure within the tire. As soon as the desired inflation pressure is reached, the pressure sensor generates electrical signals which are proportional to the inflation pressure and which are passed to the control means. The control means then actuates the closure means operatively associated with the compressed air conduit, in such a way that the closure means moves into the closure position so that the column of air which is contained in the rotating parts of the apparatus is sealed off. That substantially eliminates the above-mentioned danger that fluctuations in the radial forces produced during the testing run can no longer be properly detected, by virtue of adjustments to the tire inflation pressure to compensate for air leakages.

In a preferred feature of the invention the pressure-receiving surface of the pressure sensor may be disposed in a wall surface which delimits the pressure chamber. For that purpose the pressure sensor can be arranged in the peripheral surface of a guide cylinder on which the axially displaceable measuring rim portion is slidably carried. The pressure sensor is disposed at a part of the surface of the guide cylinder, which is always within the pressure chamber defined between the measuring rim portions and the tire.

A suitable form of pressure sensor is a piezoelectric measuring transducer, a capacitively operating measuring transducer, or any other suitable measuring transducer which is responsive to pressure and which can output electrical measurement signals in response to a variation in pressure. The output signals of the measuring transducer may be passed to a suitable evaluation arrangement for performing monitoring and evaluation operations in testing operations in which variations in pressure in the hermetically sealed, rotating part of the system are aspects of interest.

Further objects, features and advantages of the present invention will be apparent from the following description of a preferred embodiment thereof.

BRIEF DESCRIPTION OF THE DRAWING

The single FIGURE of the accompanying drawing is a diagrammatic view of an embodiment of the apparatus according to the invention.

DESCRIPTION OF THE PREFERRED EMBODIMENT

Referring now to the drawing, shown therein is part of a tire testing machine which serves to support and mount first and second measuring rim portions 1 and 2. The measuring rim portion 2 is secured to a spindle 3 which is mounted rotatably in a mounting housing portion 21. The mounting housing portion 21 is in turn secured to a machine frame structure as indicated generally at 23. A further mounting housing portion 22 is also fixed in a stationary position on the machine frame structure 23. The further mounting housing portion 22 will be described in greater detail hereinafter.

The other measuring rim portion 1, being the upper rim portion in the view in the drawing, is slidably mounted on a guide cylinder 10 in the axial direction thereof, the axis of the guide cylinder 10 being indicated by the line A in the drawing. As illustrated, in use of the apparatus, a pneumatic tire 24 to be tested is mounted in position between the two measuring rim portions 1 and 2. For the purposes of fitting the pneumatic tire 24 in position, the guide cylinder 10 and the measuring rim portion 1 slidably carried thereon are moved away from the stationary measuring rim portion 2 after release of a locking arrangement as indicated at 25 which serves for locking the two measuring rim portions 1 and 2 together. The installation is shown in the drawing in the locked condition in which therefore the two measuring rim portions 1 and 2 with the pneumatic tire 24 carried between them are locked together.

For the purposes of actuating the locking means 25, the apparatus has a pneumatically actuable locking cylinder member 14. The cylinder member 14 is guided in the direction of the axis A in a corresponding axial bore in the spindle 3. First and second pneumatic operating chambers 26 and 27 are provided for producing axial displacement of the cylinder member 14. The chambers 26 and 27 are defined in a cylindrical recess in the spindle 3 and are communicated with respective compressed air conduits 32 and 33 by way of compressed air ducts 28, 29 and 30, 31 respectively, which are formed in the spindle 3, the housing portion 22 and a piston guide means indicated at 16, which will be described in greater detail hereinafter.

In the locking position of the locking means 25, as illustrated in the drawing, the upper pneumatic chamber 27 is supplied with compressed air by way of the compressed air conduit 33 so that a piston portion 34 which is formed on the cylinder member 14 is displaced into and held in its lower or downward position as illustrated, and the locking means 25 is thus in a locking condition for non-rotatably connecting the two measuring rim portions 1 and 2.

In that operating position of the arrangement, compressed air for filling the tire to be tested to the desired inflation pressure is supplied to the installation by way of a further compressed air conduit 35. The compressed air supplied through the compressed air conduit 35 passes by way of an annular air duct 36 which is formed in the inside wall surface of the lower mounting housing portion 22, and openings 17 and 18 in the cylindrical wall portion of the cylindrical piston guide means 16, and thence into the interior as indicated at 11 of the cylinder member 14. The interior 11 of the cylinder member 14 thus performs the function of an air conduit for carrying air towards the tire to be tested, which is held between the measuring rim portions 1 and 2. The air conduit 11 extends axially in the cylinder member 14 and thus longitudinally within the internal bore in the spindle 3, until it reaches through openings 37 and 38 provided in the wall of the cylinder member 14. The openings 37 and 38 communicate with an annular air conduit 39 which is formed in the wall of the internal bore in the spindle 3.

A second air conduit 12 for carrying compressed air to the tire to be tested extends from the annular air conduit 39 transversely through the body of the spindle 3 to an intermediate space 7 defined between the first and second measuring rim portions 1 and 2. The air conduit 12 which in the illustrated embodiment extends inclinedly upwardly towards the right in the drawing thus opens into the space 7 between the rim portions 1 and 2 so that the space 7 and the interior of the tire, as indicated at 6, can be suitably filled with compressed air. The compressed air for inflating the tire is supplied from a per se known pneumatic installation which is diagrammatically indicated at 40 and which thus includes the necessary compressed air source. The above-mentioned compressed air conduits 32 and 33 for actuating the cylinder member 14 and therewith the locking means 25 can also be connected to the pneumatic installation 40.

For the purposes of inflating the tire 24 to be tested, the tire is firstly inflated to a preliminary pressure which is somewhat higher than the reference pressure to which the tire is to be properly inflated. The pressure in the tire is then adjusted to the reference pressure by means of a fine pressure regulator which is of a known design configuration and will therefore not be described in greater detail herein, being a part of the pneumatic installation 40 in the illustrated embodiment.

Operatively associated with the pressure chamber formed by the intermediate space 7 between the measuring rim portions 1 and 2 and the interior 6 of the tire 24 to be tested is a pressure sensor 5 having a pressure-receiving surface 8. In the illustrated embodiment the surface 8 of the pressure sensor 5 faces directly into the space 7 and thus detects the pressure therein. The surface 8 of the pressure sensor 5 thus constantly monitors the inflation pressure in the interior 6 of the tire 24 and the intermediate space 7. The pressure sensor is connected to an electric line 41 which passes through a suitable passage in the guide cylinder 10 and which is in turn connected to a collecting or sliding contact ring as indicated diagrammatically at 19. The pressure sensor, in response to the pressure in the interior 6 of the tire 24 and in the intermediate space 7, outputs electrical signals which are proportional to the detected pressure and which are passed by way of the electric line 41 and the ring 19 to a control means as indicated diagrammatically at 4. As soon as the inflation pressure in the interior 6 of the tire and in the intermediate space 7 reaches the desired or reference pressure, the control means 4 outputs a corresponding control signal for actuating a closure means which is indicated at 13, whereby the air conduit 11 is pressure-tightly shut off at the lower opening of the cylinder member 14.

The closure means 13 comprises a closing piston 15 which is arranged in the cylindrical guide means 16 for reciprocating movement axially in the direction of the axis A. The piston guide means 16 is non-rotatably connected to the spindle 3 and is thus carried rotatably in the mounting housing portion 22. The closing piston 15 is actuated by a pneumatic cylinder arrangement 42 having a piston rod 43 which connects the piston of the cylinder arrangement 42 to the closing piston 15. Under the control of the above-mentioned control means 4, the pneumatic cylinder arrangement 42 can move the closing piston 15 upwardly in the drawing in to the closure position thereof or can move it downwardly in the drawing out of the closure position. Suitable pressures for the desired position of the closing piston 15, namely either the closure position or the open position thereof, are produced in the operating chamber of the pneumatic cylinder arrangement 42 by way of a valve device 44 which is actuated by the control means 4 and which is suitably connected to the pneumatic installation 40.

Instead of the pneumatic cylinder arrangement 42 for actuating the closing piston 15, it is also possible to provide a different form of actuating means, for example an electromagnetic unit with moving coil, which thus actuates the closing piston 15 in dependence on the control signals from the control means 4.

The drawing shows the closing piston 15 in the open position thereof. When the tire 24 to be tested has been inflated to the desired inflation pressure (referred to as the reference pressure), the control means 4, in dependence on the output signal from the pressure sensor 5, which is proportional to the reference pressure, outputs a corresponding control signal to the valve device 44 and the pneumatic installation 40. As a result, the pneumatic cylinder arrangement 42 is actuated in such a way that the closing piston 15 is moved upwardly in the drawing to the closure position thereof. In that condition of the installation, the column of air contained in the two air conduits 11 and 12, in the interior 6 of the tire 24 and in the intermediate space 7 between the measuring rim portions 1 and 2 is hermetically closed off. A testing drum (not shown) can then be brought into contact with the pneumatic tire 24 to be tested and the tire 24 is then accelerated to the desired testing speed for carrying out the tire testing run. During the testing operation the testing drum is pressed against the tread surface of the tire 24, with a presettable pressure. Thus, during the testing run the two measuring rim portions 1 and 2 rotate, together with the tire 24. The guide cylinder 10, in the peripheral surface of which is disposed the pressure sensor 5, also rotates with the tire, at the same speed of rotation as the tire, about the axis indicated at A. In addition, the spindle 3, the cylinder member 14 which has the air conduit 11, the piston guide means 16 and the closing piston 15 also rotate at the same speed of rotation as the tire 24.

That configuration provides that the column of air contained in the air conduits 11 and 12, the interior 6 of the tire 24 and the intermediate space 7 is delimited and contained by components which all rotate at the same speed so that there is no possibility of air leakage losses occurring due to mutually adjoining components rotating at different speeds of rotation, or between components, some of which are stationary and some of which are rotating. The fact that the pressure sensor 5 is arranged in the pressure chamber defined by the intermediate space 7 and the interior 6 of the tire 24 means that the installation provides direct information about the inflation pressure obtaining in the pressure chamber.

As indicated the electrical signals produced by the pressure sensor 5 may also be applied to an evaluation arrangement indicated at 20 if the pressure conditions in the interior 6 of the tire are to be monitored under certain testing conditions.

As the fluctuation in air pressure within a revolution of the tire, correlates to the geometrical uniformity of the tread surface of the tire, the fluctuation in filling pressure during a revolution of the tire can be referred to or utilized as a measurement in respect of geometrical uniformity or non-uniformity of the tire. Evaluation can thus be effected on the basis of the amount and/or the functional variation in the fluctuation in air pressure.

Referring now again to the mechanical structure of the apparatus, rolling bearing assemblies 45 and 46 are provided for rotatably mounting the spindle 3 in the upper housing portion 21. A further rolling bearing assembly 49 is provided for rotatably mounting the cylindrical piston guide means 16 which is connected by a flange connection to the spindle 3 at a location indicated at 48. An additional rolling bearing assembly 47 may also be provided between the closing piston 15 and the piston rod 43 of the pneumatic cylinder arrangement 42 so that the closing piston 15 can satisfactorily rotate relative to the piston rod 43 of the pneumatic cylinder arrangement 42. The cylinder arrangement 42 is connected by a flange connection to the lower end of the housing portion 22 in the manner indicated in the drawing.

The tire can be driven at the required speed of rotation in the test run by means of a driven testing drum which, as mentioned above, is brought into contact with the tire 24 to be tested. In the illustrated construction, the spindle 3 and therewith the locked measuring rim portions 1 and 2 may also be driven, for which purpose the apparatus has a drive device 50 which by way of a belt 51 drives a belt pulley 52 which is suitably fixed on the spindle 3.

At the end of a testing operation, the locking device 25 can be released by compressed air being introduced by way of the air conduit 32 so that the piston 34 which is connected to the cylinder member 14 and therewith also the cylinder member 14 itself are moved downwardly in the drawing into the release position of the arrangement. In that condition, the two measuring rim portions 1 and 2 can thus be released and the upper measuring rim portion 1 can be moved upwardly away from the lower measuring rim porting at the end of the test run so that the tested tire can be removed from the measuring rim portions 1 and 2, to be replaced by another tire which has then to be tested.

It will be appreciated that the above-described construction has been set forth solely by way of example and illustration of the principles of the present invention and that various modifications and alterations may be made therein without thereby departing from the spirit and scope of the invention.

We claim:

1. Apparatus for monitoring and controlling the inflation pressure of a pneumatic tire to be tested in a tire testing machine, comprising: first and second rim portions which are rotatable about a common axis, for receiving the tire to be tested between them, thereby delimiting a pressure chamber formed by the interior of the tire and the intermediate space between the measuring rim portions; means for relative axial displacement of the measuring rim portions; a spindle connected to and adapted to rotate with a said measuring rim portion; a stationary compressed air source; a compressed air conduit means disposed rotatably with the spindle and the measuring rim portions, for feeding compressed air for inflating the tire from the compressed air source and passing same into said pressure chamber; a pressure sensor mounted rotatably with the measuring rim portions and having at least one pressure-receiving surface operatively disposed in said pressure chamber, thereby to be directly subjected to the effect of the inflation pressure in the pressure chamber; a closure means adapted to rotate with said spindle and said measuring rim portions and actuable between an open position in which air can pass through said compressed air conduit means and a closed position in which said compressed air conduit means is closed thereby; and a control means adapted to control the feed of compressed air by way of the compressed air conduit means into the pressure chamber in dependence on the air pressure detected in said pressure chamber by the pressure sensor, said control means being operable to actuate said closure means in response to the inflation pressure in said pressure chamber as the control parameter for the control means.

2. Apparatus as set forth in claim 1 wherein the pressure-receiving surface of the pressure sensor is disposed in a wall surface delimiting said pressure chamber.

3. Apparatus as set forth in claim 2 wherein said means for producing said relative axial displacement of the measuring rim portions comprises a guide cylinder operatively connected to an axially displaceable measuring rim portion and wherein said wall surface which accommodates said pressure sensor is part of the peripheral surface of said guide cylinder.

4. Apparatus as set forth in claim 1 wherein said compressed air conduit means is adapted to be closed by said closure means, at the end of the compressed air conduit means which is in opposite relationship to said pressure chamber.

5. Apparatus as set forth in claim 1 wherein said compressed air conduit means comprises a first compressed air conduit extending coaxially in said spindle and a second compressed air conduit communicating with the first compressed air conduit and extending therefrom through the spindle to said pressure chamber.

6. Apparatus as set forth in claim 5 and further including a locking means for locking said measuring rim portions in their positions for mounting a tire therebetween, and a locking cylinder member which is disposed coaxially in the spindle movably in the axial direction thereof and also rotatable with the spindle and connected to said locking means, the first compressed air conduit including said locking cylinder member.

7. Apparatus as set forth in claim 1 wherein said closure means is adapted to pressure-tightly close off a volume of air defined in said compressed air conduit means and said pressure chamber, the apparatus components enclosing said volume of air being adapted to rotate at the same speed of rotation in operation of the apparatus.

8. Apparatus as set forth in claim 1 wherein said closure means comprises a substantially cylindrical guide means disposed coaxially in said spindle , and a closing piston axially slidable in said guide means in dependence on control signals from sad control means, said closing piston being adapted to rotate with said compressed air conduit means at the same speed as same.

9. Apparatus as set forth in claim 8 wherein said guide means is also adapted to rotate at said same speed of rotation.

10. Apparatus as set forth in claim 8 wherein said guide means has a cylindrical wall portion, wherein said cylindrical wall portion has at least one opening therethrough to provide a flow communication for the feed of compressed air from said compressed air source to said compressed air conduit means, and wherein said closing piston is adapted to close said flow communication in said second position of said closure means.

11. Apparatus as set forth in claim 8 and further including a locking means for locking said measuring rim portions together and comprising a locking cylinder member which is axially movably disposed coaxially in said spindle, said cylinder member forming a part of said compressed air conduit means and wherein said locking cylinder member has a first end forming the end of said compressed air conduit means which is adapted to be closed by said closing piston, said end of said locking cylinder member being guided in said guide means.

12. Apparatus as set forth in claim 1 and further including an evaluation means to which said pressure sensor is operatively connected and adapted to detect fluctuations in inflation pressure of the volume of air which is sealingly closed off by said closure means in said pressure chamber in each revolution of said tire to be tested as a measurement in respect of geometrical non-uniformity of said tire.

13. A tire testing machine comprising: a housing means; a spindle rotatably mounted by said housing means; a first measuring rim portion fixed on said spindle for rotation therewith; a second measuring rim portion carried by said spindle rotatably therewith and displaceably in the axial direction thereof, the first and second measuring rim portions co-operating to mount a tire to be tested therebetween; a compressed air source outside the spindle; compressed air conduit means within the spindle for feeding compressed air from said compressed air source to the interior of the tire to inflate same between said first and second measuring rim portions; a pressure sensor mounted to rotate with said spindle and having a pressure-receiving surface adapted to be subjected to the inflation pressure within the tire; a closure means operatively associated with said compressed air conduit means and actuable between a first position in which said compressed air conduit means is open for a flow of compressed air therethrough and a second position in which said compressed air conduit means is closed by said closure means; and a control means operable to actuate said closure means of said compressed air conduit means in order thereby to control the feed of compressed air by way of said compressed air conduit means into said tire to be tested, in response to actuation of said pressure sensor in dependence on the pressure detected thereby in the tire to be tested.

* * * * *